(12) United States Patent
Ciavolino

(10) Patent No.: US 6,956,932 B2
(45) Date of Patent: Oct. 18, 2005

(54) METHOD AND SYSTEM OF CONTROLLING PROMOTIONAL CALL-INS

(76) Inventor: Marco Ciavolino, 1603 Belvue Dr., Forest Hill, MD (US) 21050-4604

( * ) Notice: Subject to any disclaimer, the term of this patent is extended or adjusted under 35 U.S.C. 154(b) by 144 days.

(21) Appl. No.: 10/364,309

(22) Filed: Feb. 10, 2003

(65) Prior Publication Data

US 2004/0013248 A1 Jan. 22, 2004

Related U.S. Application Data

(60) Provisional application No. 60/355,536, filed on Feb. 8, 2002.

(51) Int. Cl.[7] .............................................. H04M 11/00
(52) U.S. Cl. ................................ 379/93.13; 379/93.12; 379/91.02
(58) Field of Search ......................... 379/93.13, 91.02, 379/93.12, 88.25, 224, 917, 93.26, 88.16; 463/41

(56) References Cited

U.S. PATENT DOCUMENTS 5,056,086 A * 10/1991 Libonati ..................... 370/259
5,436,963 A * 7/1995 Fitzpatrick et al. ..... 379/218.01
5,633,924 A * 5/1997 Kaish et al. ............ 379/266.03
2001/0048676 A1 * 12/2001 Jimenez et al. ............. 370/352

* cited by examiner

*Primary Examiner*—Melur Ramakrishnaiah
(74) *Attorney, Agent, or Firm*—Law Offices of Royal W. Craig

(57) ABSTRACT

A method and system for receiving, logging, answering, controlling, and forwarding calls from radio or other promoter call-in contestants, wherein said method provides an efficient means for controlling call-in contests. Radio call-in contests are the most typical, but the method applies to other types of promotions, such as direct mail, store banners and print ads. The system consists of a voice vendor, web server, database, telecommunications, and application software to control and count the calls and to provide administrative functions. Every caller receives a positive response, acknowledgement and notification of the caller number, and an opportunity to obtain other benefits, such as discounted items. Only the winning caller is forwarded to the radio station. The radio station only needs to answer to the winning caller. All other callers, including those callers after the winning caller is determined, receive a response on the first try, without needing to repeatedly redial to get through on the telephone line.

4 Claims, 10 Drawing Sheets

METHOD AND SYSTEM OF CONTROLLING PROMOTIONAL CALL-INS

CROSS-REFERENCE TO RELATED APPLICATIONS

The present application derives priority from U.S. provisional application No. 60/355,536 filed on Feb. 8, 2002.

BACKGROUND OF THE INVENTION

1. Field of the Invention

The present invention relates to promotional call-in contests, and more specifically, to a method and system for receiving, logging, answering, controlling, and forwarding calls from contestants.

2. Description of the Background

Radio stations generally broadcast twenty-four hours per day, seven days per week, during which time they earn revenue. Though there are no standards regulating the number of commercial minutes per hour, the market drives the amount of commercial time because consumers tend not to tolerate an over-abundance of commercials in lieu of programming. Commercial stations tend to broadcast in the range of ten to eighteen minutes per hour of commercial time, including announcements such as traffic and weather updates. Thus, stations may try to increase revenue by increasing prices. However, prices are also market driven. A better alternative is to find other "off-air" sources of advertising revenue, and this can be accomplished by combining promotional contests with commercial broadcasting. Many radio stations currently use "winning caller" contests to promote the radio station and its sponsors. Typically, an on-air disc jockey will announce that the "nth" caller will win "x". For example, the disc jockey will announce that the tenth caller wins tickets to a football play-off game. Once the announcement is made, contestants begin calling the radio station. Radio stations generally dedicate one telephone line to receive the calls. Thus, most callers repeatedly receive a busy signal and continue to redial the radio station. For example, if 500 listeners call within the first ten seconds after the announcement, 499 receive a busy signal. Callers lucky enough to actually get through and not get a busy signal are told that they are not a winner, unless, of course, they are the tenth caller. The tenth caller, or "winner" is told to stay on the line until someone records their identifying information. All callers after the winning call receive a busy signal or no answer. The result is frustration and dissatisfaction on the part of all but the one winning caller. This type of "winning caller" contest is most popular with radio stations nationwide, but is also used in other promotional methods, such as direct mail, print ads and store banners. Indeed, for radio stations, it generates listener interest and thus promotes the radio station. However, the frustration that may be attributed to the "non-winning caller" experience may often contribute to consumer dissatisfaction.

Methods for controlling telephone calls are well demonstrated in the prior art. For example, U.S. Pat. No. 6,253,069 to Mankovitz shows a method and apparatus for providing a reply to a telephone caller in response to an abbreviated input string. A message is received from a telephone caller during a telephone call and supplemental information is derived which relates to the caller and the call. Using the message from the caller in combination with the supplemental information, an appropriate message reply is identified and provided to the caller. The supplemental information would generally include the caller telephone number and the time and date of the call. However, in the foregoing and all other known examples, providing information in response to telephone requests is limited to streamlining the method for input of data from the telephone caller or in capturing the data from the caller for subsequent use. None of the foregoing nor any other known systems provide a method of receiving, logging, answering, controlling, and forwarding telephone calls from contestants, if necessary.

It would be greatly advantageous to provide a method and computer architecture for logging, answering, controlling, and forwarding telephone calls from call-in contestants, such that every caller receives a positive response, acknowledgment and notification of their caller number in the queue, and an opportunity to obtain other benefits, such as discounted items. The present method automates the call-in process, removes the negative experience for the consumer, and adds advertising revenue and value to the station and its sponsors. The radio station only needs to answer to the winning caller, all callers, including those callers after the winning caller, receive a response, and the stations can generate revenue from the calls by advertising. Such a method would benefit the consumer, the advertiser and the radio station. Consumers benefit because they have a positive experience when they participate in call-in contests, rather than frustration and dissatisfaction. The advertiser benefits by providing a method to target consumers with instant feedback advertising. Finally, the radio station is benefitted in having an additional source of revenue and improved public relations.

SUMMARY OF THE INVENTION

It is therefore an object of the present invention to provide a method for logging, answering, controlling, and forwarding telephone calls from call-in contestants, such that every caller receives a positive response, acknowledgment and notification of the caller number, and an opportunity to obtain other benefits, such as discounted items.

It is a further object of the present invention to provide a method for call-in contests that allows the radio station, or other promoter to use the telephone key pad or Internet web to configure the call-in" event.

It is a still further object of the present invention to incorporate a voice system to answer simultaneous calls, increment caller counts, and capture extended CallerID and related data.

It is yet another object of the invention to automatically transfer only the winning caller to the radio station.

It is another object to incorporate commercials when the caller phones in.

It is yet another object to automatically connect to the advertiser if requested by the caller.

It is another object to maintain a database of call-in events and caller activity. It is another object to provide reports of call-in statistics.

The present method has universal application to a number of call-in opportunities. For example, a regional or national organization, such as a hotel or restaurant chain, could sponsor a contest rewarding the 10,000th caller, with lesser prizes awarded to some other incremental callers. The organization is afforded the opportunity to market to all listeners, and more specifically, all callers. The non-winners may be afforded the opportunity to receive a coupon book if requested. Likewise, a non-profit organization could use the method to raise funds. The organization would announce a call-in contest where the two millionth caller wins a car. The organization would establish a "900" number, whereby each call would generate a $1.00 charge on the caller's telephone bill, which is passed through to the organization.

Radio stations, or other promoters, could also offer the same contests to Internet users, whereby "callers" would respond via Email.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
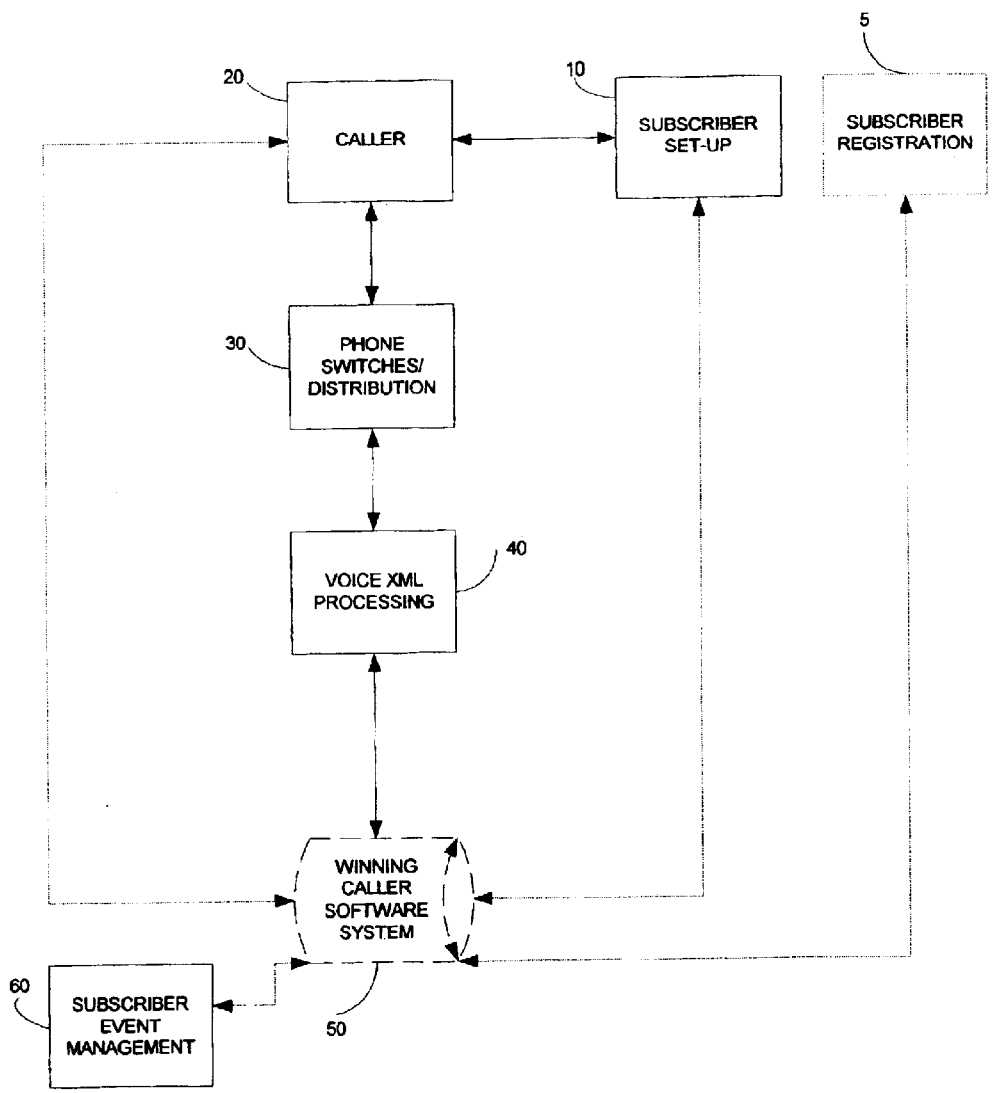
FIG. 1 is a flow diagram of the method of receiving, logging, answering, controlling, and forwarding calls from contestants.

FIG. 1 is a flow diagram of the method of receiving, logging, answering, controlling, and forwarding calls from contestants according to the present invention. The method begins with a radio station registration process at Step 5, where radio stations are required to register as a subscriber in order to avail themselves of the internet-based method of the present invention. Radio stations or other promoters ("subscriber") access the system via the Internet, telephone, or mail. Key subscriber data, such as name, organization, address, Web address, Email address and telephone number, are captured. The radio station registration process is described in more detail in FIG. 5.

Next, at Step 10, any subscriber radio station or other promoter can set up a call-in event by using the telephone key pad or Internet web interface. Setting up the call-in event is described in more detail in FIGS. 6 and 7. After it has been set up the call-in event can begin.

At Step 20, the call-in contest event begins with caller contestants using a telephone or Internet access to connect to the system. Any voice telephone device or dialing device (computer modem) can be used to access the system. The inbound telephone lines are digital connectors that handle numerous simultaneous connections. The execution the call-in contest is illustrated in greater detail in FIGS. 8 and 9.

At Step 30, the inbound calls are managed and routed to various servers as will be described. Switches allow the voice vendor to maintain a large pool of inbound lines that may be shared by multiple external vendors. Routing of calls is described in more detail in FIG. 4.

At Step 40, the inbound calls are routed to a Voice XML processor that provides the gateway or translator for the winning caller software system. It performs Text-to-Speech and Speech-to-Text translations as the caller and server interact. The components of this process are complex and most efficiently handled by a voice vendor. The voice processor is described in more detail in FIG. 3.

A winning caller software module 110 is executed at Step 50. This software 110 provides administrative management and call-in management, processes requests from the server, and tracks activity as illustrated in more detail in FIG. 2.

At Step 60, the subscriber performs event management to follow up on an event by obtaining statistics and viewing reports. Event management is described in detail in FIG. 10.

Figure 2:
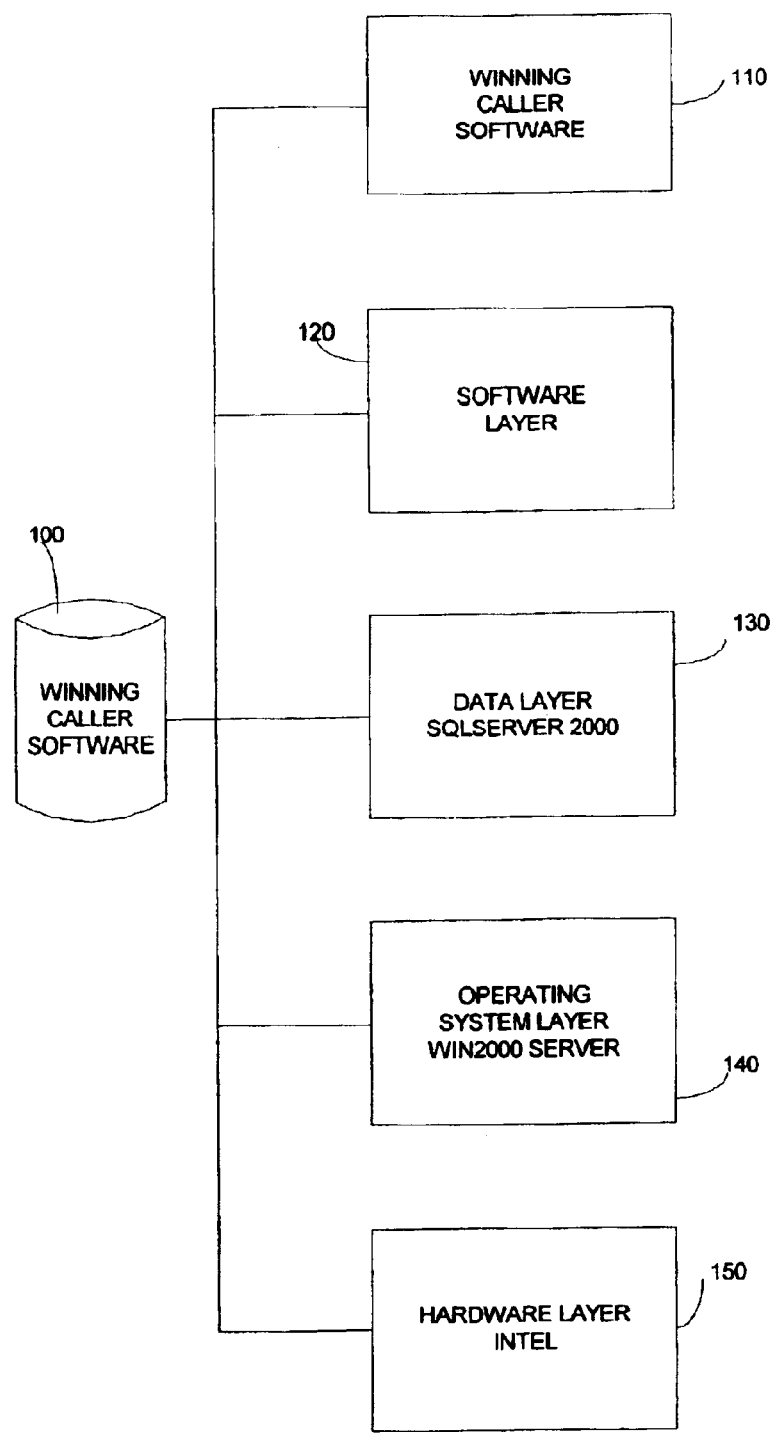
FIG. 2 is a flow diagram of the winning caller software system.

FIG. 2 is a configuration diagram of the winning caller software module 110. The winning caller software 110 comprises all of the programming code required to execute the winning caller call-in process, inclusive of administrative management and call-in management, and activity tracking. These tasks are accomplished by the winning caller software module 110 using data-driven output from the VoiceXML server. Administrative management tasks include adding/updating subscriber information, billing and reporting. Call-in management tasks include setting up new call-in events, managing marketing efforts and reporting. Requests are received from the VoiceXML server and processed. The processed requests are transmitted back to VoiceXML server for response to the caller. All activity is tracked and tallied.

The Software Layer 120 represents the software used in the present invention. Key components include an application server, Java/Java Script, utility and maintenance, and performance statistics software. Macromedia's ColdFusion is an exemplary application server. Utility and maintenance software includes back-up and retrieval and disk maintenance. Performance statistics software includes tools for performance monitoring, usage, and errors. Exemplary tools are WebTrends and Accrue.

The Data Layer 130 provides the data repository and data management. A preferred exemplary data management system is Microsoft's SQLServer 2000.

The Operating System Layer 140 consists the underlying operating system, which may be Windows 2000 Professional Server or the like.

The Hardware System 150 consists of Intel or competitive hardware in appropriate configurations.

Figure 3:
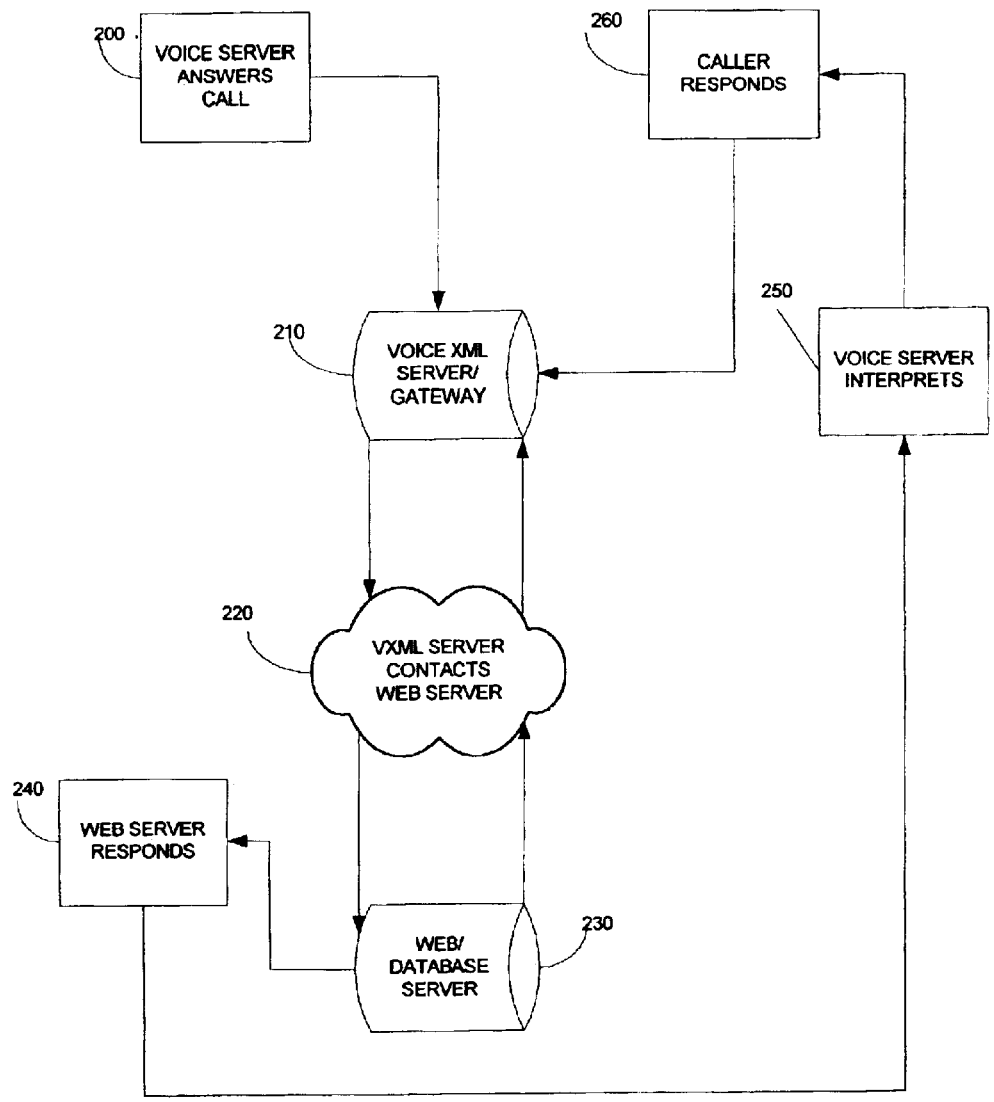
FIG. 3 is a flow diagram of the voice process.

FIG. 3 is a flow diagram of the voice process using VoiceXML. VoiceXML uses standard Web server technology. This eliminates the need for expensive voice processing equipment and the building or buying of proprietary systems. At Step 200, a caller connects to the voice server 210, which answers the call and requests instructions from the web server 230. The voice server connects to the Web server using open TCP/IP or dedicated lines 220. At Step 240, the Web server responds with properly formatted output for the Voice server. The Voice server at Step 250 interprets the text by performing a TTS (Text-to-Speech) conversion so that the caller receives a voice response. At Step 260, the caller responds by voice or telephone key pad and the voice server 210 performs a STT (Speech-to-Text) conversion. Standard Web and Application servers and databases are used to generate dynamic VoiceXML. This process allows one set of scripts/programs to handle an unlimited number of users and customers. It also eliminates the need for expensive dedicated customized systems and hardware for voice processing. Once a call is initiated, Steps 210 through 260 are executed repeatedly until the caller hangs up or otherwise ends the call.

Figure 4:
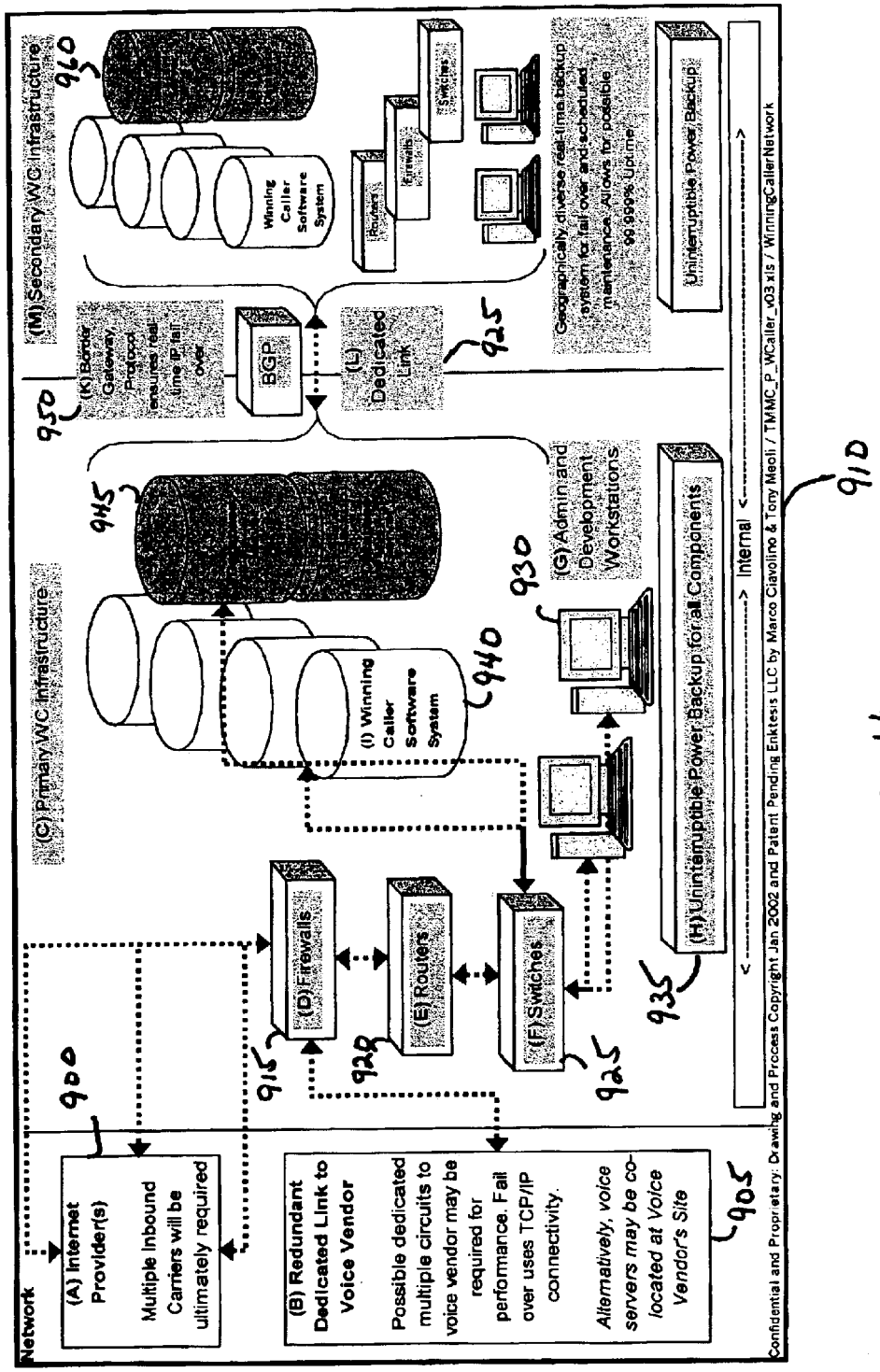
FIG. 4 is a diagram of the network infrastructure of the present invention.

FIG. 4 is a diagram of the network infrastructure of the present invention. At least two Internet Service Providers 900 are required for each server installation to ensure system availability for web access. A redundant dedicated link 905 to the voice vendor is necessary to ensure smooth access to the software servers and to ensure efficient performance. Alternatively, voice servers may be co-located at the voice vendor's site. The primary winning caller infrastructure 910 consists of firewalls 915, routers 920, switches, 925, administrative and development work stations 930, uninterruptible power back-up for all components, the winning caller software system 940, the database server and the backup database server 945. Firewalls 915 provide high levels of control and security. Routers 920 direct network traffic. Switches 925 provide local distribution of the network traffic. Back-up power supplies 935 ensure that the system is not interrupted for power outages. The winning caller software 940 performs the application tasks as described in FIG. 2. Databases 945 reside on dedicated servers with realtime redundancy for recovery. Border Gateway Protocol 950 to the secondary winning caller infrastructure 960 by means of a dedicated link 955 ensures realtime fail over for system access from outside the organization. The complete loss of facility or significant local disasters would not disable the system. The secondary winning caller infrastructure is a replicate of the primary infrastructure maintained in a geographically diverse area.

Figure 5:
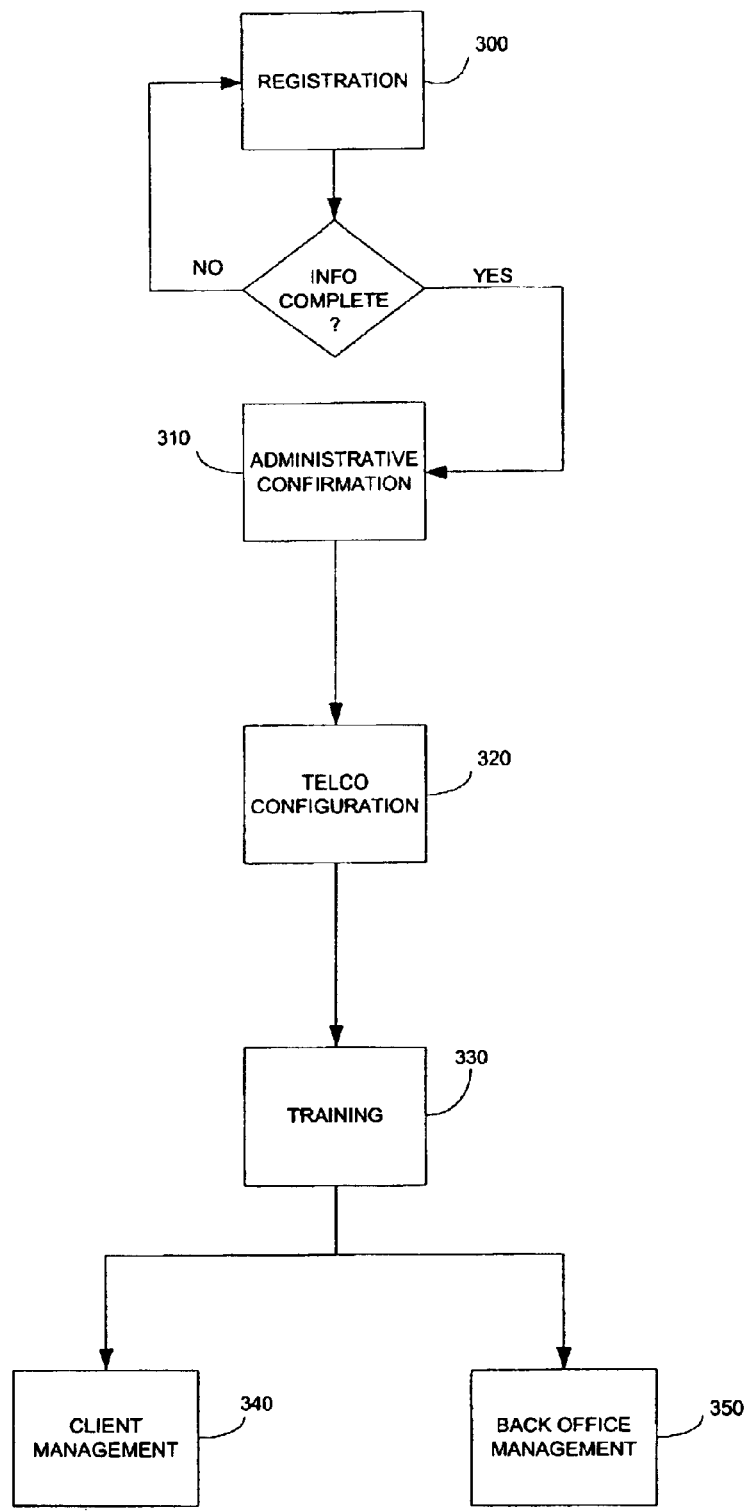
FIG. 5 is a flow diagram of the registration process of the present invention.

FIG. 5 is a more detailed flow diagram of the radio station registration process of the present invention. At Step 300, the radio station, or other promoter, (subscriber) accesses the system via the Internet web, telephone, or mail. Key subscriber data, such as name, organization, address, Web address, Email address and telephone number, are captured. If the initial information is not complete, Step 300 is repeated. If the initial information is complete, set-up steps are performed and confirmation is established at Step 310. Additional key client data, payment method, telephone numbers, and phone links are established. Training is scheduled and forms are signed. Step 320 is the configuration of telecommunications related services, such as assigning telephone numbers, redirect phone numbers, callerID sets. At Step 330 new subscribers are trained via remote sessions. Each subscriber manages most of its own data at Step 340, including maintaining subscriber information, scheduling and configuring call-in events, submitting and managing voice messages, and retrieving reports and statistics. Back Office management at Step 350 is handled by the winning caller organization, and reviews all client data, tracks master statistics, and performs billing.

Figure 6:
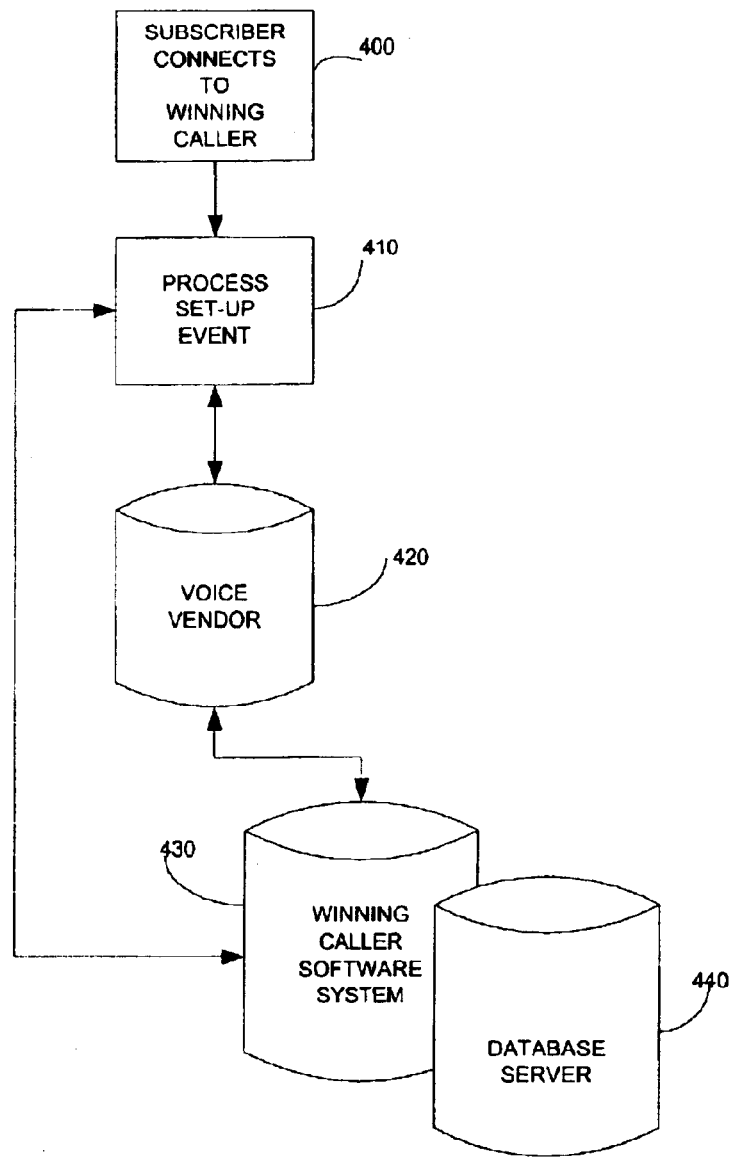
FIG. 6 is a diagram of the overall process for setting up call-in events.

FIG. 6 is a diagram of the overall process for setting up call-in events. At 400, the subscriber uses telephone or direct Web and telephone for advanced functions to access for setting up the call-in event (or contest). At 410, the subscriber sets up the call-in event. The setup is accomplished through the voice vendor 420, which is described in detail in FIG. 3. The winning caller software 430 includes the functions necessary to establish or maintain a call-in event. Winning caller software 440 is described in detail in FIG. 2. The database server 450 houses the data necessary for the winning caller system.

Figure 7:
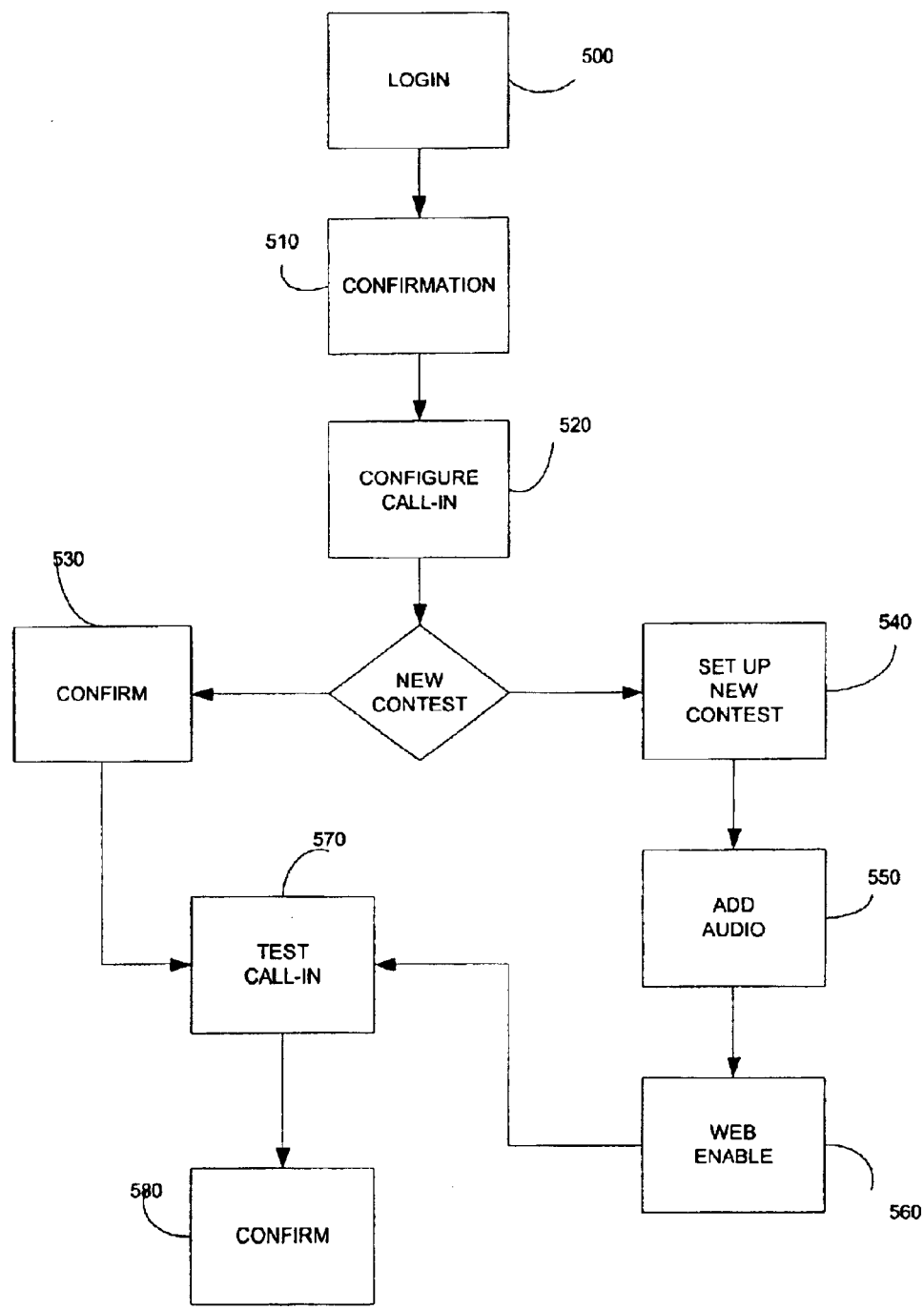
FIG. 7 is a flow diagram of the steps necessary for setting up call-in events.

FIG. 7 is an expanded flow diagram of the steps necessary for setting up call-in events as shown in Step 410 of FIG. 6. At Step 500, the subscriber logs into the system via telephone or Internet Web. Application security ensures authorization of login. At Step 510, the login is confirmed and appropriate authority is granted. The main menu configures the call-in at Step 520, providing access to authorized functions only. For example, if an on-air disc jockey only has authority to activate a pre-defined call-in event, only that function would be available. If the call-in has been pre-defined, at Step 530 the request is confirmed and may be tested. If the call-in event is new, at Step 540, the caller sets up the event. Setting up the event requires information such as date and time of call-in run, duration of event, repetitive or one-time call, incremental prizes, if any, telephone number and number of callers. Intermediate prizes call forward to advertisers may also be established. The caller may elect to add audio segments to the call at Step 550. Simultaneous Web access may be enabled at Step 560, allowing contestants to use a browser to participate. These contestants are counted as if they had telephoned, and are limited to one entry per contestant. Step 570 provides complete testing of winning and non-winning calls. At Step 580, the a confirmation is sent via Email or facsimile to all appropriate personnel.

Figure 8:
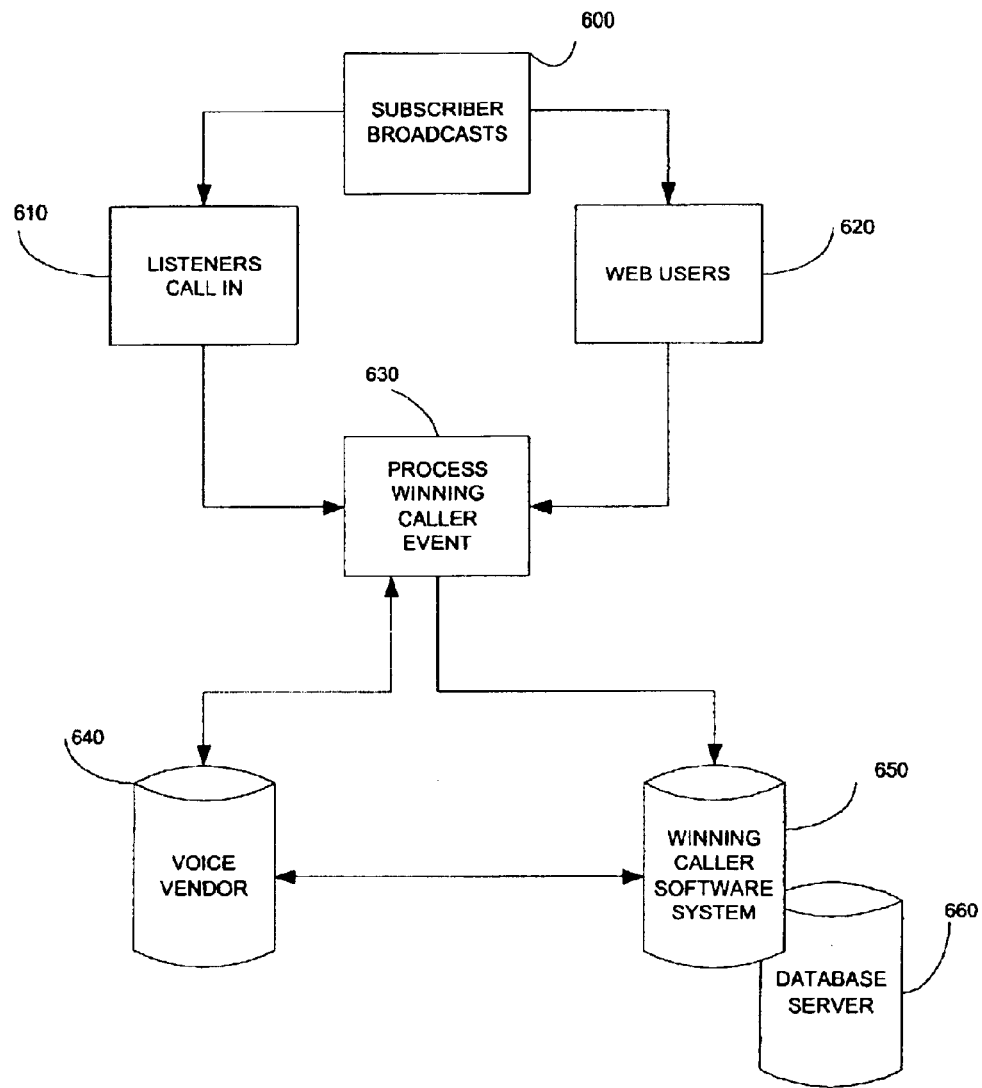
FIG. 8 is a diagram of the process of executing call-in events.

FIG. 8 is a diagram of the process of executing call-in events. The public presentation of the call-in Event is initialized by on-air announcement or other forms of marketing, such as direct mail, print ads, store banners. At Step 600, the subscriber (radio station) broadcasts the contest, such as "Be the 120' caller and win a trip to Disney World; other prizes throughout". At Step 610, many callers call in at once and get a response on the first try. Some contests may continue over a period of time and callers may call in on multiple occasions. Web users may enter the contest at Step 620. At Step 630, the winning caller call-in event is processed. Step 630 is shown in more detail in FIG. 9. The voice vendor handles the translation of voice-to-text and text-to-voice at Step 640, which is described in detail in FIG. 3. Winning caller software 650 is described in detail in FIG. 2. The database server 660 houses the data necessary for the winning caller system.

Figure 9:
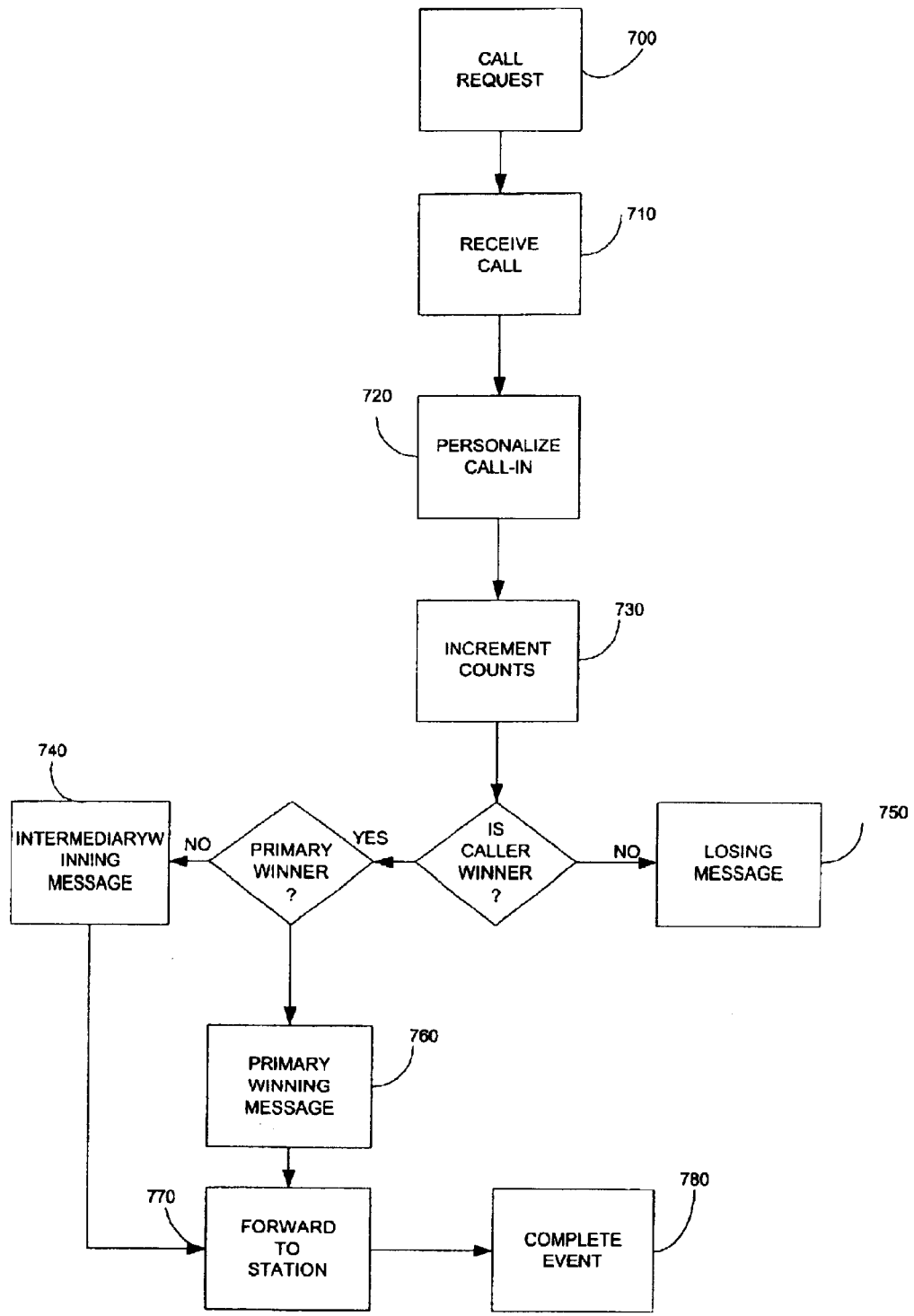
FIG. 9 is a flow diagram of the steps necessary to execute call-in events.

FIG. 9 is an expanded flow diagram of the steps necessary to execute call-in events as shown in Step 630 of FIG. 8. The process begins at Step 700 wherein a call request comes in from a caller via the VoiceXML gateway or directly from the Web. A standard welcome statement is generated and control is transferred to the caller. At Step 710, the winning caller software system receives the call or Web request and captures critical information, such as, CallerID or Web address data. The captured data is compared to previous caller activity for the caller and the telephone number used for the call-in is identified at Step 720. Based on the inbound telephone number and the captured data, the correct call-in configuration is selected and optional delivery of personalized messages occurs. If an associated advertisement has been selected, the advertisement is presented. At Step 730 the caller count is incremented and if requested, advertising statistics are also collected. A voice message is generated to the caller advising the number of the call. The incremental counts are used to determine the winner status. If the caller count is not a winner, at Step 750, a losing message is generated to the caller, either by voice or via the Web, depending upon the mode of access by the contestant. At such time, the caller may elect to be forwarded to the advertiser or to provide a telephone number for a followup call. All calls related to the call-in event are answered, even those calls that are received after the winning caller is determined. If the caller is an intermediary winner, such that he or she is not the nth caller, but some incremental count less than the nth caller, an intermediate win message is generated to the caller at Step 740. If the caller is the nth caller or the grand winner, a primary win message is generated at Step 760. At Step 770, the winning caller is prompted to record their telephone number and address, if desired. The caller may be directly forwarded to the radio station or the winner's information is Emailed to the station as an audio attachment, confirmed by an Email or facsimile with the caller's data that has been captured from the call. At Step 780, the call may be forwarded to an advertiser upon caller's request. The call may be ended with a closing message. Statistics are compiled and forwarded to appropriate personnel.

Figure 10:
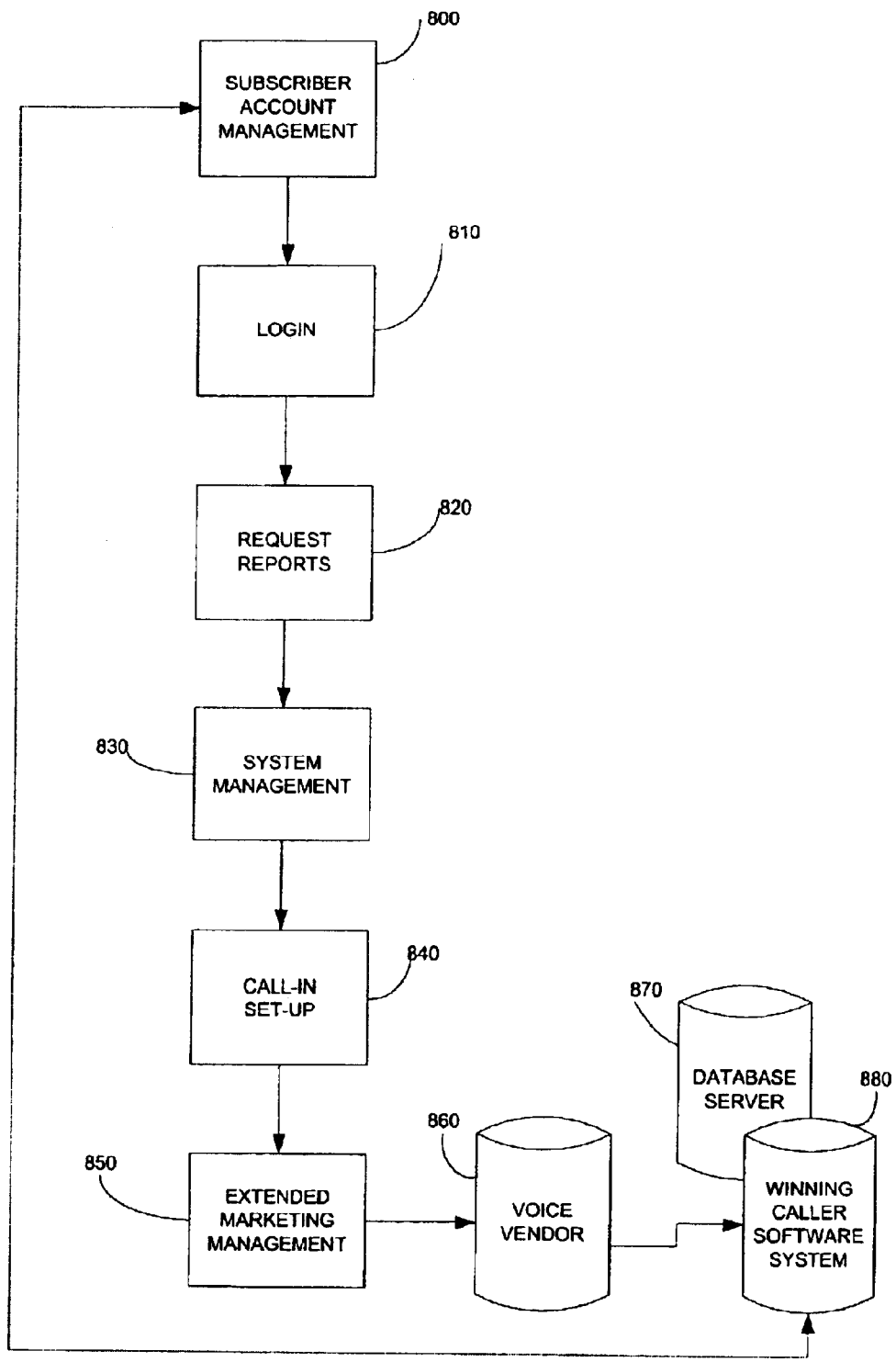
FIG. 10 is a flow diagram of winning caller event management.

FIG. 10 is a flow diagram of winning caller event management. At Step 800, the subscriber (radio station) elects to follow up to retrieve reports and obtain statistics. The subscriber logs in at Step 810. Login is authorized and confirmed at Step 820. Reports are requested at Step 830. Reports include call statistics, advertising statistics, billing data, and winner data. At Step 830 system management is performed. System management functions include user set-up and maintenance, advertiser set-up and maintenance, banners and graphics, multi-media, audio messages, and phone numbers. Call-in events are configured at Step 840. At Step 860, extended marketing management functions are performed. These functions include Email bulk mailings and personalization management. The voice vendor handles the translation of voice-to-text and text-to-voice at Step 860, which is described in detail in FIG. 3. The database server 870 houses the data necessary for the winning caller system. Winning caller software 880 is described in detail in FIG. 2.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

I claim:

1. A method for administering call-in contests for an advertising subscriber, comprising the steps of:
    registering an advertising subscriber by capturing key subscriber data;
    providing an interface for allowing said advertising subscriber to schedule and configure a call-in contest event, said interface allowing said advertising subscriber to enter date and time of said event, duration of said event, at least one prize, and a winning caller number;
    publicizing said call-in contest event;
    automatically and simultaneously responding to multiple telephone calls in response to said call-in contest event, said responding step further comprising the substeps of,
        incrementing a telephone call counter for each caller,
        determining a winning caller by comparison of said winning caller number with said call counter, and
        automatically conveying a VoiceXML message to each caller informing whether or not they are the winning caller, said message including a data-to-voice translation of the call counter; and
    forwarding the winning caller to the subscriber.

2. The method according to claim 1, further comprising the step of generating statistical reports.

3. The method according to claim 1 wherein said step of automatically and simultaneously responding to multiple telephone calls in response to said call-in contest event further comprises the substep of presenting advertising messages to each caller.

4. The method according to claim 1 wherein said step of automatically and simultaneously responding to multiple telephone calls in response to said call-in contest event further comprises the substep of forwarding each caller's call to the subscriber advertiser.

* * * * *